United States Patent
Hoyes et al.

(10) Patent No.: US 7,321,009 B2
(45) Date of Patent: Jan. 22, 2008

(54) PROCESS FOR THE PRODUCTION OF VERMICULITE FOIL

(75) Inventors: John Robert Hoyes, Littleborough (GB); Stephen Woolfenden, Rochdale (GB)

(73) Assignee: Flexitallic Investments Incorporated, Houston, TX (US)

( * ) Notice: Subject to any disclaimer, the term of this patent is extended or adjusted under 35 U.S.C. 154(b) by 46 days.

(21) Appl. No.: 10/482,656

(22) PCT Filed: Jul. 3, 2002

(86) PCT No.: PCT/GB02/03062

§ 371 (c)(1),
(2), (4) Date: Jun. 16, 2004

(87) PCT Pub. No.: WO03/004578

PCT Pub. Date: Jan. 16, 2003

(65) Prior Publication Data

US 2004/0214032 A1    Oct. 28, 2004

(30) Foreign Application Priority Data

Jul. 5, 2001    (GB) ................................. 0116441.7

(51) Int. Cl.
*C08K 3/34*    (2006.01)
(52) U.S. Cl. ...................... 524/442; 524/444; 524/445; 524/448; 524/450

(58) Field of Classification Search ................. 524/442, 524/444, 445, 448, 450
See application file for complete search history.

(56) References Cited

U.S. PATENT DOCUMENTS

| 4,762,641 A | 8/1988 | Denton et al. |
| 5,336,348 A | 8/1994 | Mindler |

FOREIGN PATENT DOCUMENTS

| GB | 2122699 | 1/1984 |
| WO | WO 98/53022 A1 | 11/1998 |
| WO | WO 01/51834 A1 | 7/2001 |

*Primary Examiner*—Edward J. Cain
(74) *Attorney, Agent, or Firm*—Haynes and Boone LLP

(57) ABSTRACT

The invention is concerned with gasket sealing foils having a sealing layer with enhanced properties which is based upon chemically exfoliated vermiculite. The method of producing a sealing foil for gaskets is described. The method comprises the steps of: (a) the application of a wet sealing foil material to a forming sheet to form a layer, (b) partially drying the said wet sealing foil layer on the forming sheet; (c) removing the said layer from the forming sheet to form a core free gasket sealing foil; and (d) forming, preferably cutting, the layer into at least one suitable shape for use in the formation of a gasket The sealing foil comprises a resilient material, which comprises a CEV component in a proportion of at least 25% w/w of the sealing foil, the CEV component being at least partially derived from dry CEV. The sealing foil layer may be combined with a gasket support layer prior to or after the cutting step.

21 Claims, No Drawings

PROCESS FOR THE PRODUCTION OF VERMICULITE FOIL

The present invention is concerned with gasket sealing foils, in particular, with foils having a sealing layer with enhanced properties which is based upon chemically exfoliated vermiculite. In addition, the invention relates to methods of manufacture and use of the foil.

Exfoliated vermiculite is a known heat-resistant resilient material. Exfoliated vermiculite is conventionally formed by expanding mineral vermiculite using gas, this material being referred to herein as "gas-exfoliated vermiculite". The gas may be thermally generated, in which case the product is called "thermally-exfoliated vermiculite" (TEV). TEV may be made by flash-heating mineral vermiculite to 750-1000° C., at which temperature the water (free and combined) in the ore vaporises rapidly and ionic repulsion forces apart the silicate sheets which form the raw material, so bringing about an expansion of 10-20 times perpendicular to the plane of the sheets. The granules formed have a chemical composition which (apart from the loss of water) is virtually identical to that of the raw material. Gas-exfoliated vermiculite may also be made by treating raw vermiculite with a liquid chemical, eg hydrogen peroxide, that penetrates between the silicate sheets and subsequently evolves a gas, eg oxygen, to bring about exfoliation.

A different form of exfoliated vermiculite is known as "chemically-exfoliated vermiculite" (CEV) and is formed by treating the ore and swelling it in water. In one possible preparation method, the ore is treated with saturated sodium chloride solution to exchange magnesium ions for sodium ions, and then with n-butyl ammonium chloride to replace sodium ions with n-$C_4$—$H_9NH_3$ ions. On washing with water swelling takes place. The swollen material is then subjected to high shear to produce an aqueous suspension of very fine (diameter below 50 μm) vermiculite particles.

It is known to utilise exfoliated vermiculite as a layer of a sheet gasket, eg an automotive exhaust gasket, and for other purposes. For example, GB 2 193 953 B discloses forming sheet-like gaskets formed from particles of gas-exfoliated vermiculite. Because such particles do not cohere well, they are bound together by fine particles of CEV. The use of CEV as a binder retains heat resistance and resilience, whereas the use of other inorganic binders could result in an incompressible structure. However, although exfoliated vermiculite has excellent heat resistance and a high degree of resilience, it has poor water resistance. Furthermore, such products were manufactured using CEV with a high water content at low solids content and considerable drying problems are encountered during production due to the tendency of CEV containing materials to form a surface skin which prevents the further escape of moisture.

WO 98/53022 describes gaskets with a sealing layer and a support layer. The sealing layer is formed from a resilient material which comprises a CEV component in a proportion of at least 25% w/w of the sealing layer. The CEV component is at least partially derived from dry CEV. A hydrolysis resistant polymer to improve the water resistance of the sealing layer is also provided in the proportion of less than 20% w/w of the sealing layer.

A method of producing a gasket is also described. The method involves applying a wet sealing layer dough to a support material, and drying the wet sealing layer dough on the support material. The support material forms a core for the sealing layer and provides a support during the drying step. Spirally wound gaskets are also described.

The sealing foil from which gaskets are commonly cut or otherwise formed must have sufficient strength and flexibility to enable it to be peeled from a forming sheet, packaged, stripped and processed into a gasket without breakage. A sealing foil formed from expanded graphite foil, although relatively brittle, does have sufficient strength. However, in WO 98/53022 it is made clear that the sealing layers described do not have sufficient strength to avoid breakage during production of gaskets. Consequently, a carrier strip is used to support the sealing layer during spiral wound gasket formation. The other examples described in WO 98/53022 include a metal or glass fibre core on which the sealing layer is formed.

It is an object of at least some of the preferred embodiments of the present invention to provide a foil comprising a sealing layer with improved water resistance and improved breakage resistance. It is a further such object to provide a foil with a sealing layer with reduced loss in stress retention and low creep. It is a further such object of the present invention to provide a foil with surprising improvements.

According to a first aspect of the present invention there is provided a method of producing a sealing foil for gaskets comprising the steps of:
(a) the application of a wet sealing foil material to a forming sheet to form a layer;
(b) partially drying the said wet sealing foil layer on the forming sheet;
(c) removing the said layer from the forming sheet to form a core free gasket sealing foil; and
(d) forming, preferably cutting the layer into at least one suitable shape for use in the formation of a gasket; the sealing foil comprising a resilient material, the resilient material comprising a CEV component in a proportion of at least 25% w/w of the sealing foil, the said CEV component being at least partially derived from dry CEV.

According to a second aspect of the present invention there is provided a sealing foil for a gasket comprising a resilient material, the resilient material comprising a CEV component in a proportion of at least 25% w/w of the sealing foil, the said CEV component being at least partially derived from dry CEV, the sealing foil not including a core carrier material wherein the sealing foil is suitable for forming, preferably cutting, into a suitable shape for use in combination with a gasket support layer.

The sealing foil layer may be combined with a gasket support layer prior to or after the cutting step.

According to a third aspect of the present invention there is provided use of a sealing foil for a gasket, the said sealing foil comprising a resilient material, the resilient material comprising a CEV component in a proportion of at least 25% w/w of the sealing foil, the said CEV component being at least partially derived from dry CEV, the sealing foil not including a core carrier material, in the manufacture of a gasket.

According to a fourth aspect of the present invention there is provided a method of manufacture of gasket comprising the steps of:
(a) applying a sealing foil comprising a resilient material, the resilient material comprising a CEV component in a proportion of at least 25% w/w of the sealing foil, the said CEV component being at least partially derived from dry CEV, the sealing foil not including a core carrier material to a support layer to form a gasket material and, optionally,
(b) forming, preferably cutting, the gasket material to thereby form the required gasket shape.

It is envisaged that the first step may be preceded by the step (c) of removal of the sealing foil from a forming sheet. Alternatively, step (b) may be carried out prior to step (c). Preferably, the sealing foil of the present invention is at least partially dry prior to use as a sealing foil.

Preferably, the resilient material also comprises a hydrolysis resistant polymer to improve the water resistance of said sealing strip, the proportion of the said polymer not exceeding 20% w/w of the sealing strip.

Surprisingly, it has been found that the use of such levels of CEV gives the sealing strip sufficient strength to be used in manufacture of gaskets as a dry or semi-dry foil without the use of a core material as a support whereas hitherto it had been expected that the use of vermiculite rendered the sealing foil too brittle for such purposes without the use of a core or carrier strip.

Preferably, the resilient material further comprises a plate like filler material, preferably, a milled filler material.

Preferably, the sealing strip has a small moisture content during use in manufacture and, preferably, during removal from a forming sheet on which the sealing foils are formed.

Preferably, the moisture content sufficiently reduces the brittleness of the foil or sufficiently increases the cohesion of the foil to allow said manufacture and removal from the forming sheet without damage, such as splitting or tearing, to the foil.

For the avoidance of doubt, a gasket of the present invention may provide conventional sealing between static or moving parts.

Preferably, the proportion of CEV is at least 30% w/w of the sealing foil, more preferably at least 35% w/w of the sealing foil.

Typically, the level of CEV falls within the range 25-80% w/w of the sealing foil, more typically, 30-75% w/w of the sealing foil, most typically 35-70% w/w of the sealing foil.

Preferably, the proportion of the said polymer is less than 15% w/w of the sealing foil, more preferably, less than 10% w/w. Especially preferred is a level of polymer less than 7.5% w/w, more especially preferred is a level of polymer in the range 1.0-7.5% w/w of the sealing foil.

The length of the sealing foil is one suitable for use in subsequent processing. The foil may be flat packed or stored on rolls. For instance, foils of length of more than 1 m may be used, for example up to or greater than 5 m.

Preferably, the chemically exfoliated vermiculite component of the present invention includes sufficiently dry CEV, to provide a wet sealing layer dough with a reduced water content which is capable of being dried before substantial skinning has occurred.

The term hydrolysis resistant polymer includes any suitable elastomer such as silicon and carbon based elastomeric polymers. Suitable polymers for use with the present invention include:

nitrile butadiene rubbers, styrene butadiene rubbers, natural rubber, butyl rubber, siloxanes (particularly organosiloxanes such as dialkyl siloxanes) and ethylene-propyldiene monomer. Diene-based polymers are suitable because they are flexible and hydrolysis-resistant.

The support layer for gasket manufacture may be made of any suitable support material with which the sealing foil may be combined to form the non-spirally wound gasket.

Suitable support layer materials include stainless steel and carbon steel which may both be in the form of solid metal cores or thin sheets. The solid metal cores may be suitably profiled or machined to receive the sealing layer.

The thin sheets may be in the form of solid sheets, tanged sheet or perforated sheet. Tanged sheet is especially preferred. Other suitable support materials include:

wire mesh, such as expanded metal and woven gauze; fibre mesh, such as glass fibre mesh; cloth; or a non woven material, such as tissue.

According to a fifth aspect of the present invention there is provided a gasket comprising a sealing foil comprising a resilient material, the resilient material comprising a CEV component in a proportion of at least 25% w/w of the sealing foil, the said CEV component being at least partially derived from dry CEV, wherein the sealing foil has a moisture level of between 3-20% w/w of the sealing foil resilient material during manufacture of the said gasket.

Preferably, the moisture level of the sealing foil during manufacture is between 2-10% w/w of the resilient material of the sealing foil, most preferably, 3-5% w/w.

Preferably, the sealing foil comprises 80% resilient material, more preferably 90% resilient material, most preferably, it consists substantially wholly of resilient material.

The sealing foil in accordance with this aspect of the invention may or may not include a core material or carrier strip.

Preferably, the solids content of the wet sealing foil material prior to the drying step of the first aspect is in the range 20-70% w/w of the material.

It is also envisaged that the step (c) may be carried out after step (d).

Preferably, the forming sheet is capable of withstanding drying temperatures applied to the wet sealing foil layer. The forming sheet may be stainless steel, a non-reactive polymer such as PTFE or other suitable material to which the foil does not stick.

Preferably, the solids content of the said sealing foil layer is in the range 25-60% w/w of the wet material, more preferably, 30-55% w/w of the wet material, most preferably, 35-50% w/w of the wet material.

Preferably, in accordance with any aspect of the present invention the CEV is mixed with a suitable plate-like filling agent such as thermally exfoliated vermiculite (TEV). Preferably, the filling agent is milled. Preferably, the filling agent comprises less than 75% w/w of the sealing strip, more preferably, less than 70% w/w, most preferably, less than 65% w/w of the sealing foil. Preferably, the water content of the partially dried layer during removal from the forming sheet is 3-20% w/w, more preferably 5-15%, most preferably 7-13%. The forming sheet may be a moving belt which may be continuous or not. In many cases the TEV content in the layer is less than 55% w/w.

A further drying step may be carried out after removal of the sealing layer foil material from the forming layer. Alternatively, it may be allowed to air dry on the forming layer.

A wet sealing foil layer material dough in accordance with the present invention may be dried at temperatures between 50-135° C., more preferably, 60-130° C., most preferably, 80-125° C. The material may also be allowed to dry around room temperature but it is envisaged that this will be difficult to commercialise.

Preferably, the wet sealing foil material is spread onto the forming sheet using a suitable spreading technique such as the application of a doctor blade. Calendering is also envisaged.

Preferably, the wet sealing foil material is in the form of a spreadable paste, preferably, a thin paste or a thick slurry consistency is utilised.

Preferably, the relative ratio of non-dry derived CEV to dry CEV in the dried sealing foil is between 0.01:1 and 20:1, more preferably. between 0.05:1 and 10:1, most preferably between 0.1:1 and 4:1.

Since CEV is a relatively expensive material compared with gas-exfoliated vermiculite, eg TEV, in a non-spirally wound gasket according to the invention, the resilient layer may also comprise particles of gas-exfoliated vermiculite, eg the foil may comprise particles of gas-exfoliated vermiculite bonded with the particles of CEV. The material used may be milled or otherwise reduced in particle size to a particle size of less than 50 μm, however, preferably, the particle size of at least a substantial proportion is more than 50 μm, preferably, 50-300 μm, more preferably 50-250 μm, most preferably 50-200 μm. Other possible additives include talc, mica and unexfoliated vermiculite.

By dry CEV is meant CEV having a moisture content of less than 20% w/w, more preferably, less than 10% w/w, most preferably, less than 5% w/w.

Preferably, the CEV component in the wet material comprises a mixture of dried CEV and CEV available in a slurry form. However, it is necessary to use sufficient dried CEV to give an acceptable solids content. A high solids content in the wet material assists reduction in skinning in the subsequent drying process whilst maintaining a high solids content in accordance with the invention.

Preferably, the dry CEV is prepared by a suitable drying technique. Suitable drying techniques include:

cake drying and pulverising;
film drying and pulverising;
rotary hot air drying;
spray drying;
freeze drying;
pneumatic drying;
fluidised bed drying of partially dried solid; and
vacuum methods including vacuum shelf drying.

Preferably, any of the features or any preferred features of any aspect of the present invention may be combined with the first aspect and the reference to the first aspect in the method of the second aspect should be interpreted accordingly.

When utilised, the hydrolysis resistant polymer may be coupled to the vermiculite by a coupling agent.

In a gasket according to this preferred aspect of the invention, it is found that the layer is more water resistant than a material containing only vermiculite and a coupling agent and also more water resistant than a material containing only vermiculite and a polymer.

The coupling agent may be a silane, eg a vinyl functional silane such as triethoxy vinyl silane $(CH_3CH_2O)_3SiCH=CH_2$.

It is also possible for the resilient material to comprise unexfoliated (intumescent) vermiculite which can, on heating of the gasket, eg in situ, form TEV to swell the resilient layer and, thus improve sealing.

The resilient material may be bonded to the support layer by adhesive but it may be advantageous if it is mechanically bonded. Preferably, however, no adhesive is required.

In a gasket according to any aspect of the invention, it is found that the particles of the plate-like filler when present, tend to orientate themselves into the plane of the strip and act like a large number of tiny leaf springs, thereby improving sealing.

In accordance with any aspect of the present invention the plate-like filler may be selected from the group consisting of talc, molybdenum disulphide, hexagonal boron nitride, soapstone, pyrophyllite, milled thermally exfoliated vermiculite, mica, fluoromica, powdered graphite, glass flake, metal flake, ceramic flake, or kaolinites. However, a particularly preferred vermiculite material is one with a plate size substantially in the range 50-300 μm for example FPSV available from W R Grace & Co. FPSV is a registered trade mark of W R Grace & Co.

In general, a plate-like filler has an average width of plates of at least three times the average thickness.

The sealing layer may comprise 5-80%, eg 20-50%, by weight of the plate-like filler, preferably, 25-40% of the plate like filler is present in the dried sealing layer.

It is a still further object of any aspect of the present invention to provide a gasket comprising a sealing foil based on exfoliated vermiculite, which foil comprises a polymeric binder, the foil providing improved sealing at temperatures at which the binder degrades.

Optionally, the sealing foil of any aspect of the present invention also comprises an intumescent material selected so that it expands at temperatures at which said hydrolysis resistant polymer degrades.

In a gasket according to this optional feature of the invention, at temperatures which cause the binder to degrade, the intumescent material expands to at least partially fill the void left by the binder, thereby helping to maintain sealing.

Preferably, the intumescent material is unexfoliated vermiculite because, after exfoliation, it has good heat resistance. Another possibility is to use partially exfoliated vermiculite, ie vermiculite which has been exfoliated at a lower temperature than is normally required to fully exfoliate it. The unexfoliated or partially exfoliated vermiculite may be treated (by methods which are known per se) to reduce the temperature at which exfoliation occurs, eg the temperature can be reduced to as low as 160° C. Other possible intumescent materials include expandable graphite, sodium silicate, and perlite.

Preferably, the foil width is at least 10 cm, more preferably, at least 20 cm, most preferably at least 30 cm. Especially preferred are foils of width greater than 1 metre, for example 1.3 metres.

The intumescent material may form up to 50% by weight of the layer but up to 20% is preferred.

In order that the invention be better understood, embodiments of it will now be described by way of example.

There now follows a detailed description of illustrative examples according to the different aspects of the invention.

Method A

The paste is prepared as follows (Z-Blade mixer):

| | |
|---|---|
| Grace Microlite HTS Dispersion | 18.07 kg |
| Grace Microlite PCEV Powder | 9.49 kg |
| Grace FPSV Powder | 6.58 kg |
| NBR Solution * | 6.10 kg |
| Silquest Al51 Silane ** | 0.19 kg |

NB - FPSV is fine-milled TEV.
* this is prepared in a Papenmaier high sheer, high speed solution mixer; add 500 g NBR crumb to 2500 g toluene, mix 5 min (max speed), add 31.3 g Perkadox BK 40B (peroxide curing agent), mix 5 min further and then transfer into sealable container.
** equivalent to 0.103 kg silane (ethanol solution).

a) Add all except silane and rubber solution. Mix 5 min.
b) Add silane and mix 5 min.
c) Add NBR solution and mix 5 min. Dump into clean plastic bag and seal in plastic tub.

Variations on Method A:

Latex based paste, also containing 5% by dry weight of NBR incorporated in the form of water-based latex (40% solids) so that 2.50 kg of latex is equivalent to the 6.10 kg of rubber solution (sample 5).

Polymer-free paste, in which the polymer has been omitted from the above formulation (samples 1-4).

2½% latex paste prepared by halving quantity of latex in sample 5 above (Sample 9).

FURTHER EXAMPLES

Two further samples were prepared as previously described, but using a solvent-free variant of the paste based on nitrile latex (Breon 1562 (NBR latex) −40% solids). This is mixed according to the given cycle, substituting 1.02 kg of latex for the rubber solution. The removal of the solvent is intended to allow paste to be transported safely (particularly by air-freight).

METHOD OF APPLICATION

The paste needs to be applied in the form of a thick slurry ("buttercream" consistency) and is prepared by thinning the paste formulations which are described below by adding water. Take 2 parts of paste (up to 2 kg) break up into handful sized lumps in a clean container and pour over 1 part of water (by weight), stir to a consistent texture. The preferred formulation for the paste (without the additional water) is described below. An even coat of paste which dries to approximately 0.6 mm thickness is applied to a forming sheet thickness of up to 0.1 mm using a doctor blade set to about 2 mm. The paste may be allowed to dry at room temperature, whereupon the forming sheet is then removed to leave a film of paste. The film in the form of a foil 124 mm wide by up to 5 m long is then ready for use. Typically the foil is passed through crimping rollers beforehand to make it more flexible.

In one method, the possibility is envisaged of driving the forming sheet, so that it moves at a constant rate through the coating device.

The CEV used was W R Grace's HTS dispersion which is approximately 15% solids. The dry CEV used was W R Grace's "Microlite Powder". The FPSV was also obtained from W R Grace. The rubber used in these examples was either nitrile rubber N36C80 from Zeon.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of producing a sealing foil for gaskets comprising the steps of:
   (a) the application of a wet sealing foil material to a forming sheet to form a layer;
   (b) partially drying the said wet sealing foil layer on the forming sheet;
   (c) removing the said layer from the forming sheet to form a core free gasket sealing foil; and
   (d) forming, preferably cutting the layer into at least one suitable shape for use in the formation of a gasket; the sealing foil comprising a resilient material, the resilient material comprising a CEV component in a proportion of at least 25% w/w of the sealing foil, the said CEV component being at least partially derived from dry CEV.

2. A sealing foil for a gasket comprising a resilient material, the resilient material comprising a CEV component in a proportion of at least 25% w/w of the sealing foil, the said CEV component being at least partially derived from dry CEV, the sealing foil not including a core carrier material wherein the sealing foil is suitable for forming, preferably cutting, into a suitable shape for use in combination with a gasket support layer.

3. A method according to claim 1, wherein the sealing foil layer is combined with a gasket support layer prior to or after the cutting step.

4. Use of a sealing foil for a gasket, the said sealing foil comprising a resilient material, the resilient material comprising a CEV component in a proportion of at least 25% w/w of the sealing foil, the said CEV component being at least partially derived from dry CEV, the sealing foil not including a core carrier material, in the manufacture of a gasket.

5. A method of manufacture of gasket comprising the steps of:
   (a) applying a sealing foil comprising a resilient material, the resilient material comprising a CEV component in a proportion of at least 25% w/w of the sealing foil, the said CEV component being at least partially derived from dry CEV, the sealing foil not including a core carrier material to a support layer to form a gasket material and, optionally,
   (b) forming, preferably cutting, the gasket material to thereby form the required gasket shape.

6. A method according to claim 5, wherein the step (a) is preceded by the step (c) of removal of the sealing foil from a forming sheet.

7. A method according to claim 5, wherein step (b) is carried out prior to step (c).

8. A method according to claim 1, wherein the sealing foil is at least partially dry prior to use as a sealing foil.

9. A method according to claim 1, wherein the sealing strip has a small moisture content during use in manufacture.

10. A method according to claim 1, wherein the sealing strip has a small moisture content during removal from a forming sheet on which the sealing foils are formed.

11. A gasket comprising a sealing foil comprising a resilient material, the resilient material comprising a CEV component in a proportion of at least 25% w/w of the sealing foil, the said CEV component being at least partially derived from dry CEV, wherein the sealing foil has a moisture level of between 3-20% w/w of the sealing foil resilient material during manufacture of the said gasket.

12. A method according to claim 1, wherein the solids content of the wet sealing foil material is in the range 20-70% w/w of the wet sealing foil material prior to partially drying the said wet sealing foil layer on the forming sheet.

13. A method according to claim 1 wherein the wet sealing foil layer material dough is dried at temperatures between 50-135° C.

14. A method or gasket or sealing foil according to claim 1, wherein the resilient layer comprises particles of gas-exfoliated vermiculite.

15. A method or gasket or sealing foil according to claim 14, wherein the material used may be milled or otherwise reduced in particle size.

16. A method of producing a sealing foil according to claim 1, wherein the sealing foil width is at least 10 cm.

17. A sealing foil for a gasket according to claim 2, wherein the sealing foil width is at least 10 cm.

18. Use of a sealing foil for a gasket according to claim 4, wherein the sealing foil width is at least 10 cm.

19. A gasket comprising:
 a sealing foil comprising:
  a resilient material comprising a CEV component in a proportion of at least 25% w/w of the sealing foil, the CEV component being at least partially derived from dry CEV;
  a wet configuration in which:
   the resilient material is adapted to be applied to a forming sheet; and
   the sealing foil comprises a solids content in the range 20-70% w/w of the sealing foil; and
  a partially-dried configuration in which:
   the sealing foil comprises a moisture level of between 2-20% w/w of the resilient material; and
   the resilient material is adapted to be removed from the forming sheet.

20. A method of producing a sealing foil for gaskets, the sealing foil comprising a resilient material, the resilient material comprising a CEV component in a proportion of at least 25% w/w of the sealing foil, the said CEV component being at least partially derived from dry CEV, comprising the steps of:
 (a) the application of a wet sealing foil material comprising a mixture of dried CEV and CEV available in a slurry form to a forming sheet to form a layer;
 (b) partially drying the said wet sealing foil layer on the forming sheet;
 (c) removing the said layer from the forming sheet to form a core free gasket sealing foil; and
 (d) forming, preferably cutting the layer into at least one suitable shape for use in the formation of a gasket.

21. A sealing foil for a gasket comprising a resilient material, the resilient material comprising a CEV component in a proportion of at least 25% w/w of the sealing foil, the said CEV component being at least partially derived, during production of the gasket, from dry CEV, the sealing foil not including a core carrier material wherein the sealing foil is suitable for forming, preferably cutting, into a suitable shape for use in combination with a gasket support layer.

* * * * *